(12) United States Patent
Yoshida et al.

(10) Patent No.: US 7,815,402 B2
(45) Date of Patent: Oct. 19, 2010

(54) CUTTING INSERT FOR RADIUS CUTTER AND INDEXABLE-INSERT RADIUS CUTTER FITTED WITH THE SAME

(75) Inventors: Satoru Yoshida, Kawasaki (JP); Katsutoshi Watanabe, Toyokawa (JP); Masuo Saitoh, Toyokawa (JP)

(73) Assignees: Tunalogy Corporation, Kanagawa (JP); OSG Corporation, Aichi (JP)

( * ) Notice: Subject to any disclaimer, the term of this patent is extended or adjusted under 35 U.S.C. 154(b) by 0 days.

(21) Appl. No.: 12/583,098

(22) Filed: Aug. 14, 2009

(65) Prior Publication Data

US 2009/0311057 A1   Dec. 17, 2009

Related U.S. Application Data

(63) Continuation of application No. PCT/JP2007/067845, filed on Sep. 13, 2007.

(51) Int. Cl.
*B23B 27/00* (2006.01)
*B23B 27/02* (2006.01)

(52) U.S. Cl. .................... 407/113; 407/115

(58) Field of Classification Search ......... 407/113–116, 407/30, 66, 67, 103
See application file for complete search history.

(56) References Cited

U.S. PATENT DOCUMENTS

| | | | | |
|---|---|---|---|---|
| 5,246,315 A | * | 9/1993 | Hansson et al. | 407/114 |
| 6,227,772 B1 | * | 5/2001 | Heinloth et al. | 407/113 |
| 6,935,814 B2 | * | 8/2005 | Nagaya et al. | 407/100 |
| 7,101,122 B2 | * | 9/2006 | Horiike et al. | 407/113 |
| 7,431,540 B2 | * | 10/2008 | Lof et al. | 407/113 |

FOREIGN PATENT DOCUMENTS

| | | |
|---|---|---|
| JP | 61-219511 A | 9/1986 |
| JP | 9-174322 A | 7/1997 |
| JP | 11-090723 A | 4/1999 |
| JP | 11-156625 A | 6/1999 |
| JP | 2003-039228 A | 2/2003 |
| JP | 2005-040924 A | 2/2005 |
| JP | 2005-131788 A | 5/2005 |

OTHER PUBLICATIONS

I1. International Search Report issued by the International Searching Authority (ISA/JP) Nov. 13, 2007 in connection with International Application No. PCT/JP2007/067845.

\* cited by examiner

*Primary Examiner*—Will Fridie, Jr.
(74) *Attorney, Agent, or Firm*—John P. White; Cooper & Dunham LLP (57) ABSTRACT

A cutting insert is provided with at least a circular-arc blade cutting edge as a cutting edge in the form of a substantially quarter circular arc, at an intersection between a rake face and a flank face, and an outer cutting edge extending from one end portion of the circular-arc cutting edge. The rake face is formed so as to be convex in a direction of rotation when the cutting insert is mounted on a tool body. On a section perpendicular to the cutting edge, the rake face is inclined so as to become gentler with distance from the circular-arc cutting edge or outer cutting edge. The circular-arc cutting edge is formed to be convex in the direction of rotation. The outer cutting edge is formed so that its edge ridge line is substantially parallel to the axis of the tool body.

8 Claims, 5 Drawing Sheets

CUTTING INSERT FOR RADIUS CUTTER AND INDEXABLE-INSERT RADIUS CUTTER FITTED WITH THE SAME

CROSS-REFERENCE TO RELATED APPLICATIONS

This is a Continuation Application of PCT Application No. PCT/JP2007/067845, filed Sep. 13, 2007, which was published under PCT Article 21(2) in Japanese.

BACKGROUND OF THE INVENTION

1. Field of the Invention

The present invention relates to a cutting insert for a radius cutter and a indexable-insert radius cutter removably fitted with said tip.

2. Description of the Related Art

Contour line cutting work is performed mainly by means of a ball nose end mill, for example. However, the ball end mill has a semicircular cutting edge, and the cutting speed at the distal end portion of the cutting edge, that is, in the vicinity of the tool axis, is very low. Thus, the ball nose end mill considerably varies in cutting resistance between the vicinities of the outer periphery of the cutting edge and the distal end of the cutting edge, so that its cutting conditions are unstable.

In forming a flat surface by means of the ball nose end mill, moreover, the rate of pick feed (with a pitch perpendicular to the tool axis) cannot be increased. Since the cutting speed near the distal end of the cutting edge is low, moreover, there is a problem that a workpiece adheres to the cutting edge.

In a radius end mill, on the other hand, a cutting edge in the form of a substantially quarter circular arc is located on the outer periphery of the distal end of a cylindrical tool body. Thus, the radius end mill has no cutting edge near the axis of the tool body, so that the minimum cutting speed of the cutting edge is high. Accordingly, the radius end mill is characterized in that it is not susceptible to the aforementioned problems of the ball nose end mill.

In forming a flat surface by means of the radius end mill, moreover, the rate of pick feed can also be increased to ensure high-efficiency machining. Thus, radius end mills have recently been used with increasing frequency.

Further, there are indexable-insert radius end mills wherein a cutting edge is removably mounted on a tool body. For example, a indexable-insert radius end mill described in Jpn. Pat. Appln. KOKAI Publication No. 2005-40924 is frequently used for rough cutting work of mold and can ensure an effective reduction in tool costs.

If a feed rate, such as the rate of pick feed, is increased, the cutting resistance also increases. Thereupon, cutting edges are liable to chipping or fracture, so that the life of cutting edges may be shortened. If the pick feed rate is increased, moreover, chips for each cutting edge increase. In consequence, chips cannot be discharged smoothly, so that a tool may bite the chips.

BRIEF SUMMARY OF THE INVENTION

The object of the present invention is to provide a cutting insert for a radius cutter and a indexable-insert radius cutter, capable of smoothly discharging chips without reducing the life of cutting edges despite an increase in feed rate.

In order to solve the aforementioned problems, a cutting insert for a radius cutter and a indexable-insert radius cutter using the cutting insert are constructed as follows.

1. A cutting insert for a radius cutter removably mounted on a tool body, the cutting insert for the radius cutter comprising a seating surface, a rake face opposed to the seating surface and configured to be oriented in the direction of rotation of the tool body when mounted on the tool body, and a flank face formed between the seating surface and the rake face, wherein an intersection between the rake face and the flank face includes a cutting edge portion composed of a circular-arc cutting edge in the form of a substantially quarter circular arc, located on the outer periphery of a distal end of the tool body, and an outer cutting edge continuous with one end of the circular-arc cutting edge and extending substantially parallel to an axis of the tool body, and a portion recessed a predetermined distance inwardly from the cutting edge portion of the rake face projects on the rotation-direction side of the tool body from the cutting edge portion.

The circular-arc cutting edge need not take the form of an arc of a circle, such as a perfect circle. The outer cutting edge need not be completely parallel to the axis of the tool body, and need not be completely linear.

2. In the cutting insert for the radius cutter described in item 1, the circular-arc cutting edge is curved convexly in the direction of rotation of the tool body along the circular-arc cutting edges, and the outer cutting edge continuously contacts the circular-arc cutting edge and extends oppositely from the direction of rotation of the tool body from one end in contact with the circular-arc cutting edge toward the other end.

3. In the cutting insert for the radius cutter described in item 2, the rake face is formed so that an angle to the center of rotation of the tool body is gradually reduced with distance from the cutting edge portion. The rake face may be formed of a plurality of slopes or a continuous curved surface.

4. In the cutting insert for the radius cutter described in item 3, a flat surface perpendicular to the direction of rotation of the tool body is provided within a fan-shaped area defined by the circular-arc cutting edge and a straight line extending from the center point of the circular-arc cutting edge to both ends of the circular-arc cutting edge, if the cutting insert is viewed at right angles to the rake face.

The flat surface need not always be on a plane that passes through the center of rotation of the tool body. For example, the flat surface may be inclined with reference to that plane.

5. A indexable-insert radius cutter is constructed by removably mounting the cutting insert for the radius cutter described in any one of items 1 to 4 on the tool body.

The tool body is substantially cylindrical or columnar and is rotated around the axis thereof. At least one tip seat is provided on the distal end portion of the tool body. The cutting insert is mounted on the tip seat. The tip seat (bottom surface) need not be on the plane that passes through the axis of the tool body. In other words, the cutting insert may be mounted at an angle to the axis of the tool body.

DETAILED DESCRIPTION OF THE INVENTION

An embodiment of a indexable-insert radius cutter according to the present invention will now be described with reference to the drawings.

Figure 1:
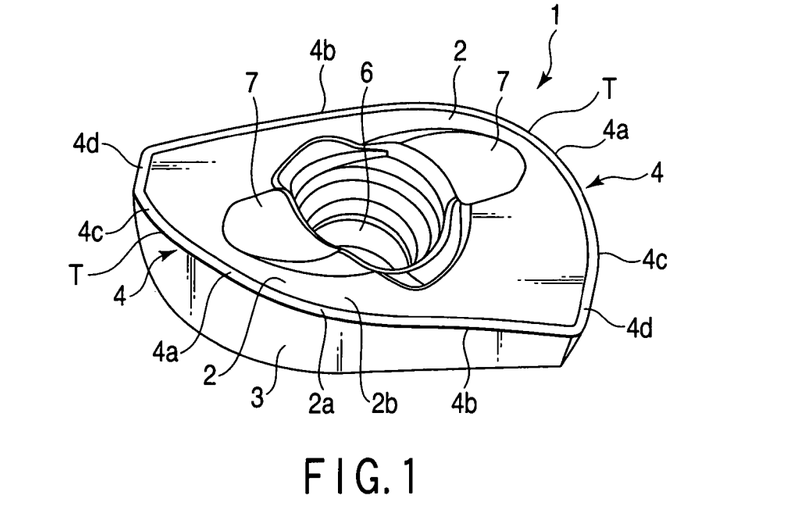
FIG. 1 is a perspective view showing an embodiment of a cutting insert for a radius cutter according to the present invention.
Figure 2:
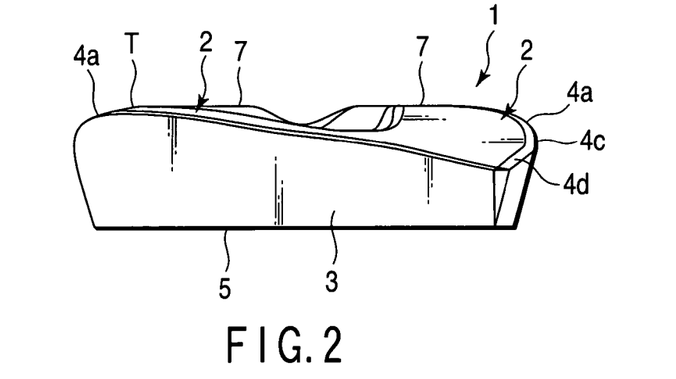
FIG. 2 is a front view of the cutting insert for the radius cutter shown in FIG. 1.
Figure 3:
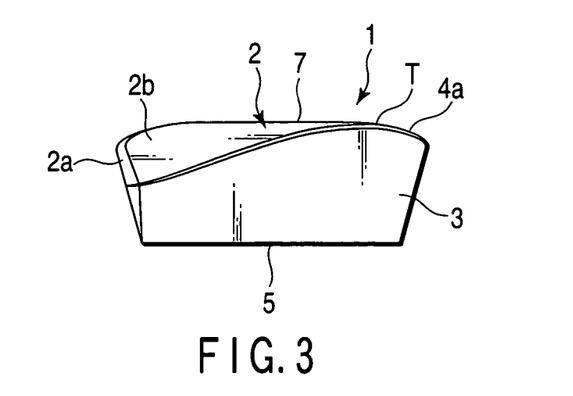
FIG. 3 is a left side view of the cutting insert for the radius cutter shown in FIG. 1.
Figure 4:
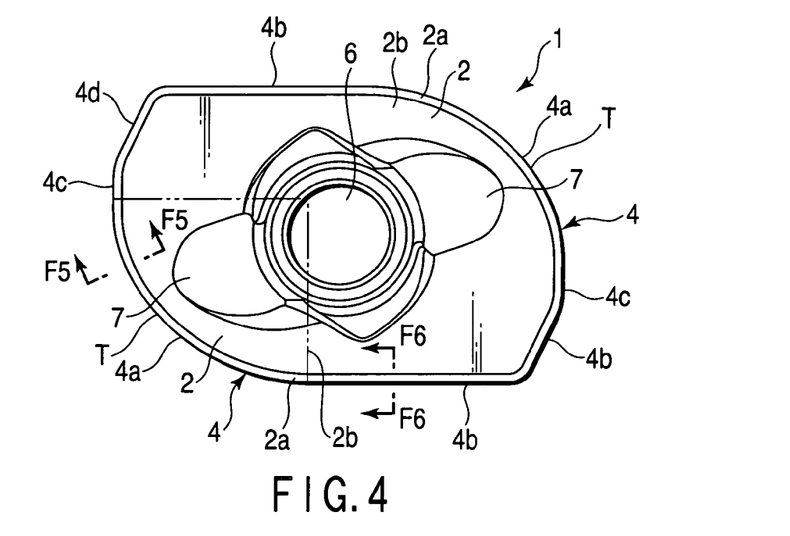
FIG. 4 is a plan view of the cutting insert for the radius cutter shown in FIG. 1.

FIG. 1 shows a cutting insert 1. The cutting insert 1 is formed of a hard material, such as cemented carbide, coated cemented carbide, cermet, or ceramic, and has a flat, substantially rhombic shape. As shown in FIGS. 1 to 4, a rake face 2 is formed on the upper surface of the cutting insert 1. As shown in FIG. 4, the rake face 2 is formed to be point-symmetrical with respect to a mounting hole 6. The mounting hole 6 is provided penetrating the cutting insert 1.

A seating surface 5 is formed on the lower surface of the cutting insert 1. The seating surface 5 is formed into a flat surface. A flank face 3 is formed covering substantially the entire circumference of the side surface of the cutting insert 1. A cutting edge 4 as a cutting edge portion is formed at the intersection between the rake face 2 and flank face 3.

As shown in FIG. 4, the cutting edge 4 is formed of circular-arc cutting edges 4a and outer cutting edges 4b. Each circular-arc cutting edge 4a is in the form of a substantially quarter circular arc. The circular-arc cutting edges 4a are provided as a pair in positions symmetrical with respect to the mounting hole 6.

Figure 5:
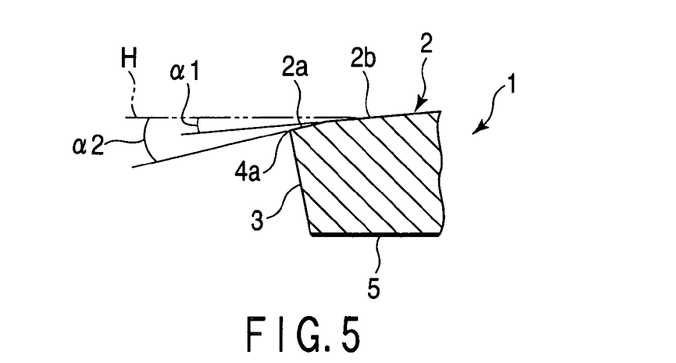
FIG. 5 is a sectional view taken along line F5-F5 in FIG. 4.

The rake face 2 is formed of a slope 2a on the side of the cutting edge 4 and a slope 2b continuous with the slope 2a. FIG. 5 is a perpendicular sectional view of the circular-arc cutting edge 4a. As shown in FIG. 5, an angle α1 between the slope 2b and a line H (indicated by a two-dot chain line) is smaller than an angle α2 between the slope 2a and line H. The line H is an imaginary line set parallel to the seating surface 5.

Further, the circular-arc cutting edge 4a is convex toward the upper side of the rake face 2. Specifically, the circular-arc cutting edge 4a has a top portion T at its substantially central part that is highest above the seating surface 5. As shown in FIGS. 2 and 3, moreover, both sides of the top portion T gradually approach the seating surface 5. The top portion T need not always be located at the central part of the circular-arc cutting edge 4a.

Figure 6:
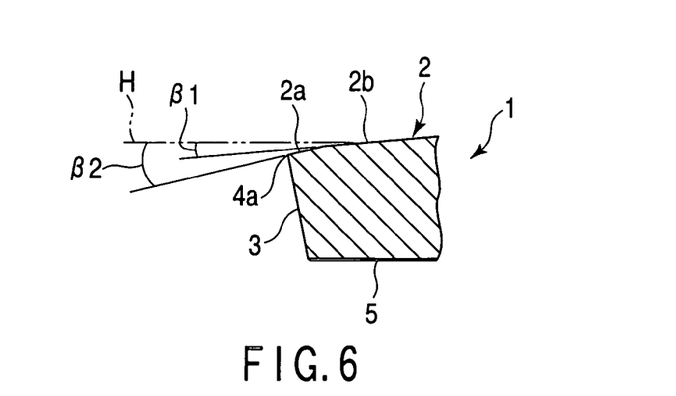
FIG. 6 is a sectional view taken along line F6-F6 in FIG. 4.

The outer cutting edges 4b are formed continuously with the circular-arc cutting edges 4a. The outer cutting edges 4b are substantially straight and are formed so as to approach the seating surface 5 gradually with distance from the circular-arc cutting edges 4a. As shown in FIG. 6, the rake face 2 that adjoins each outer cutting edge 4b, like the rake face 2 that adjoins each circular-arc cutting edge 4a, is composed of the slope 2a and slope 2b.

An angle β1 between the slope 2b and line H is smaller than an angle β2 between the slope 2a near the cutting edge and the line H. Although the width of the slope 2a is not restricted in particular, it should preferably be substantially constant throughout the circumference of the cutting insert 1.

The slope 2a and slope 2b are simultaneously molded when the cutting insert 1 is molded by powder compaction using a die set. If this is done, the necessity of a molding process, e.g., grinding, to be performed after sintering can be obviated, resulting in a reduction in manufacturing costs.

As shown in FIG. 4, moreover, minor cutting edges 4c are formed on those end portions of the circular-arc cutting edges 4a opposite from the side in contact with the outer cutting edges 4b. When the cutting insert 1 is mounted on a tool body 12, as shown in FIG. 8, the minor cutting edges 4c extend at right angles to the axis of the tool body 10.

Further, inner peripheral cutting edges 4d are formed continuously with the minor cutting edges 4c. A dish angle is given to the inner peripheral cutting edges 4d. Specifically, when the cutting insert 1 is mounted on the tool body 12, the inner peripheral cutting edges 4d decline toward the rear end side of the tool body 12, that is, on the side of a shank 15, as they approach the axis of the tool body 12.

As shown in FIG. 4, furthermore, flat surfaces 7 are formed on the rake face 2. Each flat surface 7 is formed within a fan-shaped area that is defined by each circular-arc cutting edge 4a in the form of a substantially quarter circular arc, if the cutting insert 1 is viewed at right angles to the rake face 2. The flat surfaces 7 are formed substantially parallel to the seating surface 5.

Figure 7:
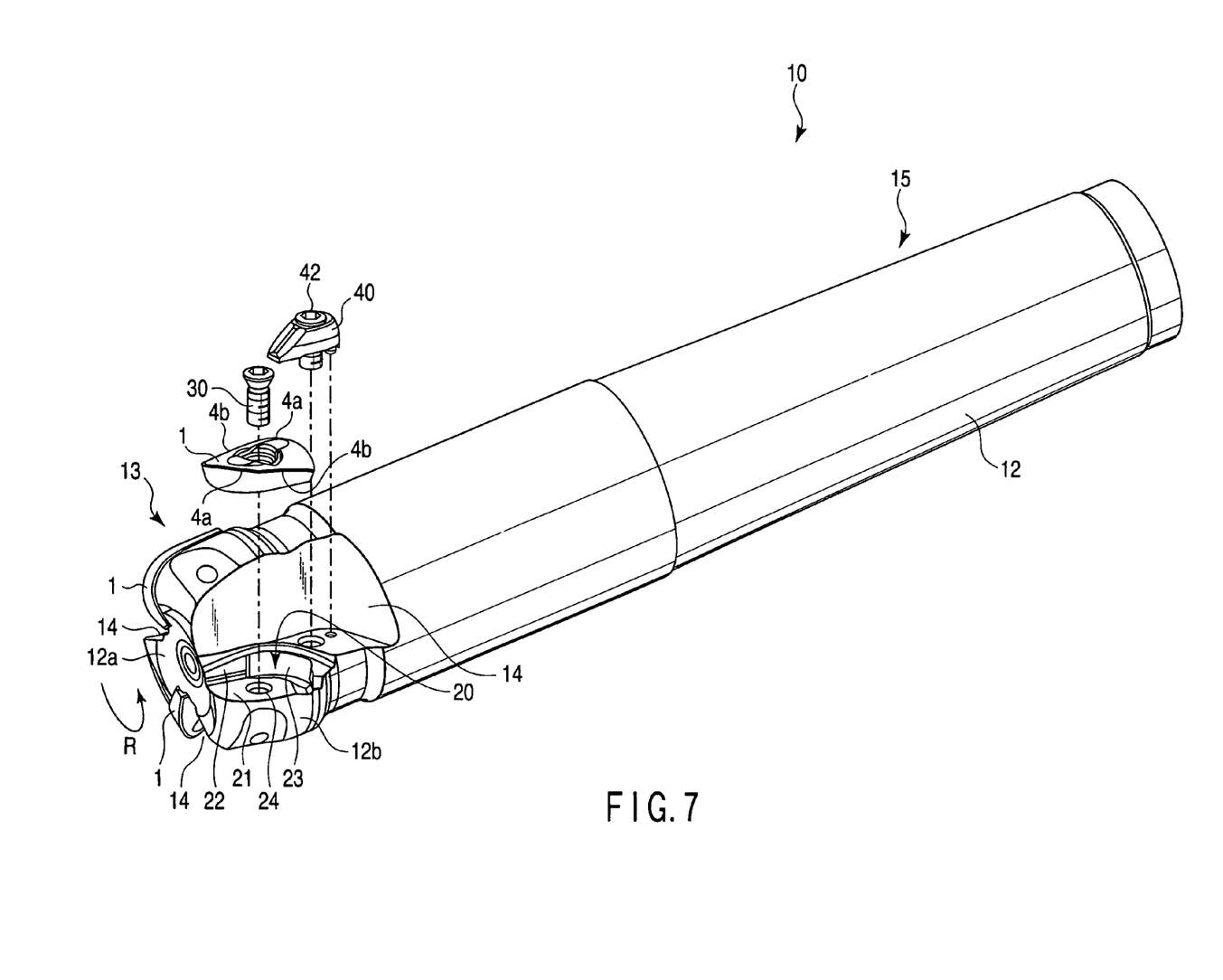
FIG. 7 is an exploded perspective view of a indexable-insert radius cutter fitted with the cutting insert shown in FIG. 1.
Figure 8:
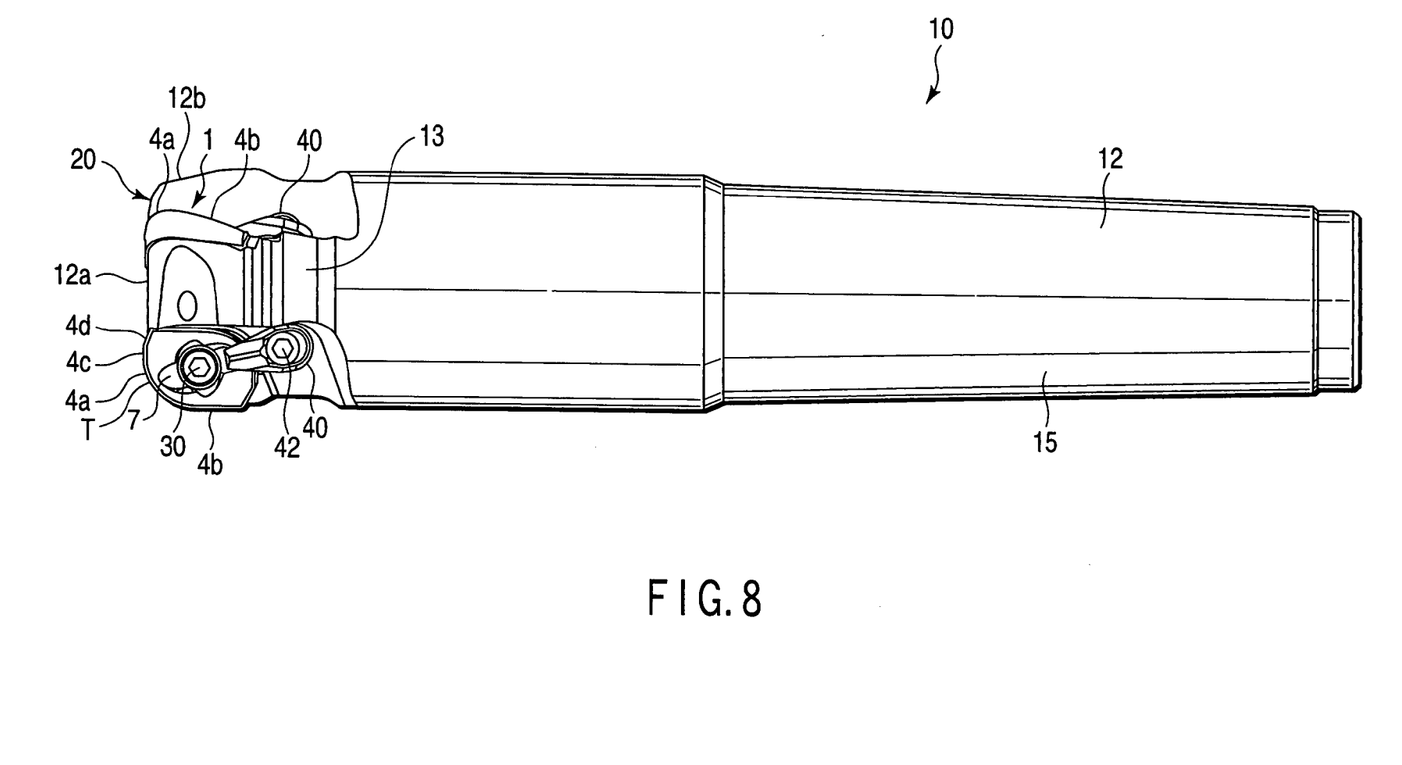
FIG. 8 is a front view of the indexable-insert radius cutter shown in FIG. 7.
Figure 9:
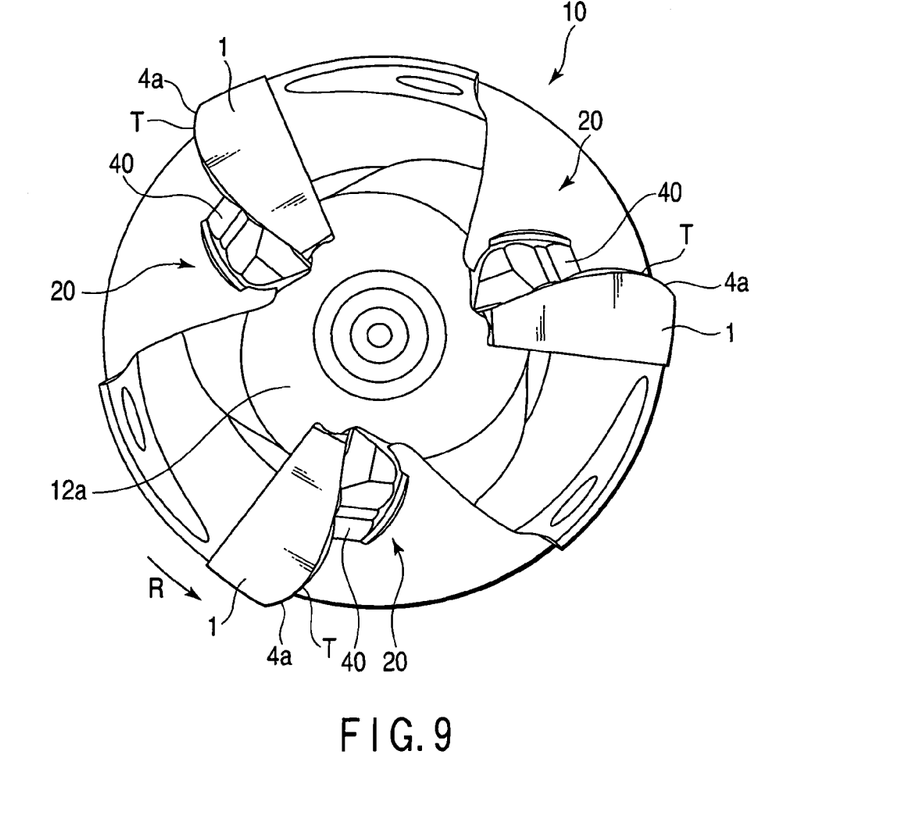
FIG. 9 is a distal side view of the indexable-insert radius cutter shown in FIG. 7.

FIGS. 7 to 9 show a radius cutter 10 that uses the cutting insert 1. The radius cutter 10 is composed of the cutting insert 1, tool body 12, etc. The tool body 12 is substantially columnar and is formed with a body 13 on the distal end side and the shank portion 15 on the rear end side. The tool body 12 may be in the form of a hollow cylinder.

Three chip pockets 14 are formed at regular circumferential intervals in the body 13. The chip pockets 14 are formed by continuously notching a distal end surface 12a and outer peripheral surface 12b of the tool body 12. A tip seat 20 is formed within each chip pocket 14. The tip seat 20 includes a bottom surface 21, wall surface 22, and wall surface 23. The bottom surface 21 is formed with an orientation in the direction of rotation R of the radius cutter 10. Further, the bottom surface 21 is formed along a plane that passes through the center of rotation of the tool body 12.

As shown in FIG. 7, the cutting insert 1 is secured to the tip seat 20 by driving a clamp screw 30 into a female threaded hole 24 in the bottom surface 21 through the mounting hole 6. Thus, the seating surface 5 is brought into close contact with the bottom surface 21 of the tip seat 20. Further, parts of the flank face 3 contact the wall surfaces 22 and 23, individually. Further, the cutting insert 1 is secured by a clamper 40. The clamper 40 is secured by a screw 42 and firmly presses the upper surface (rake face 2) of the cutting insert 1 toward the seating surface 5.

When the cutting insert 1 is secured to the tip seat 20, the rake face 2 is oriented in the direction of rotation R, the circular-arc cutting edges 4a are located on the outer peripheral portion of the distal end of the tool body 12, and the outer cutting edges 4b are arranged substantially parallel to the axis of the tool body 12.

The following is a description of cutting work using the radius cutter 10. A spindle of a machine tool (not shown) is caused to hold the shank portion 15, and the radius cutter 10 is secured. Then, the radius cutter 10 is rotated, and the feed rate is increased to perform contour line cutting work of, for example, a die set. Thereupon, a substantial cutting resistance is produced, so that a great stress acts on the circular-arc cutting edges 4a and outer cutting edges 4b.

Since the rake face 2 is convex in the direction of rotation of the radius cutter 10, however, the circular-arc cutting edges 4a and outer cutting edges 4b are strong enough to prevent sudden damage, such as chipping or fracture. Even if the feed rate is high, therefore, cutting conditions are stabilized, so that the life of the cutting edge can be extended.

Further, chips that are produced by the circular-arc cutting edges 4a are pushed up and curled (wound) above the rake face 2. Thus, the chips can be kept from moving toward the center of the tool body 12. Therefore, the problem of the chips being caught between the distal end face 12a of the tool body 12 and a workpiece to be cut can be solved.

In a cutting work at a higher feed rate, in particular, it is a serious problem that the cutting edge inevitably bites the chips. According to the radius cutter 10, its effective of paring away of the chip can be improved to such an extent that cutting can be stabilized. Further, chipping or fracture of the cutting edge due to chip biting can be prevented, so that the life of the cutting edge can be extended.

Since the rake face 2 is also convex in the direction of rotation at those parts corresponding to the outer cutting edges 4b, the chips are curled and can be discharged smoothly. Moreover, chipping or fracture due to chip biting can be prevented.

Further, each circular-arc cutting edge 4a is convex in the direction of rotation R with its top portion T pinnacled. Thus, the circular-arc cutting edge 4a has an increased thickness in its central part, so that its strength is improved. Furthermore, an impulsive force (cutting resistance) that is produced as the workpiece is cut is dispersed, whereby sudden damage, such as chipping or fracture, can be prevented.

Further, the circular-arc cutting edge 4a is streamlined extending from the top portion T toward the outer periphery of the tool body 12. Therefore, all chips that are produced by the circular-arc cutting edge 4a flow out toward the outer periphery of the tool body 12. Thus, chipping or fracture due to chip biting can be prevented. Also, the inner surface of the tip seat 20 can be prevented from being rubbed with the chips. Thus, the durability of the tool body 12 can be improved.

Each outer cutting edge 4b extends oppositely from the direction of rotation R, ranging from its one end in contact with the circular-arc cutting edge 4a to the other end. Accordingly, the impulsive force that is produced as the outer cutting edges 4b cut the workpiece can be mitigated. Thus, chipping or fracture of the outer cutting edges 4b can be prevented. Since chips produced by each outer cutting edge 4b are discharged from its one end toward the other, moreover, the chips can be discharged satisfactorily.

The workpiece to be cut can be finished flat by means of minor cutting edges 4c, so that high working accuracy can be obtained. Further, drilling such that the radius cutter 10 is fed toward the distal end by means of the inner peripheral cutting edges 4d can be performed with the retreat rate of the inner peripheral cutting edges 4d regarded as the maximum feed rate. Furthermore, contour line cutting work can be performed subsequent to the drilling.

Since each flat surface 7 is disposed within the fan-shaped area, the chips can be smoothly discharged without rubbing against or adhering to the rake face 2. The cutting insert 1 has the rake face 2 that is convex in the direction of rotation. In the case of a highly ductile workpiece, chips may spread and severely rub against the slopes 2a and 2b. In particular, the substantial undeformed chip thickness by the circular-arc blades cutting edges 4a is smaller than that of the outer cutting edges 4b. Therefore, the chips are liable to spread over the slopes 2a and 2b, and rubbing or adhesion easily occurs. This can be prevented effectively.

The rake face 2 associated with the circular-arc cutting edges 4a and outer cutting edges 4b is composed of the two slopes 2a and 2b. Thus, the cutting edge strength can be increased, and sudden damage, such as chipping or fracture, can be prevented effectively. Since the angle is reduced with distance from the cutting edge, moreover, an increase in cutting resistance can be avoided, and the chips can be kept from rubbing against the rake face 2.

The slopes 2a and 2b that constitute the rake face 2 are formed by powder compaction using the die set. Thus, the slopes 2a and 2b can be molded very easily with high accuracy. The respective edges of the circular-arc cutting edges 4a and outer edges 4b are bent three-dimensionally. It is very difficult to form the areas from the edges to the rake face 2 at different angles by grinding. This problem can be solved with ease.

Figure 10:
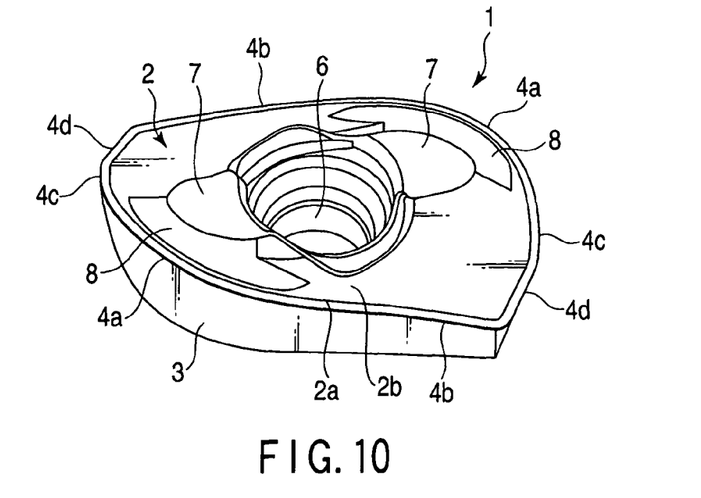
FIG. 10 is a perspective view showing a modification of the cutting insert shown in FIG. 1.

FIG. 10 shows another embodiment of the cutting insert 1. In this cutting insert 1, breaker grooves 8 are formed in a rake face 2. The breaker grooves 8 are recesses that are depressed toward a seating surface 5 and formed close to circular-arc cutting edges 4a, individually. The breaker grooves 8 serve to reduce the cutting resistance. Even if the feed rate is increased so that the undeformed chip thickness is substantial, the breaker grooves 8 can suppress vibration, chattering, etc. Thus, cutting work can be performed efficiently. In this case, as in the aforementioned case, slopes 2a and 2b may be formed between cutting edges and the breaker grooves 8.

In the foregoing example, the bottom surface 21 of the tip seat 20 is formed along the plane that passes through the center of rotation of the tool body 12. According to the present invention, however, the bottom surface 21 may be formed in a position shifted in the direction of rotation from the plane that passes through the center of rotation of the tool body 12 or in the opposite direction, or alternatively be further inclined. For example, the bottom surface 21 may be inclined so that the shank portion 15 of the bottom surface 21 is located in a position shifted in the direction opposite to the direction of rotation. Thereupon, the cutting insert 1 is pressed toward the wall surface 23, so that the mounting state is stabilized, and the cutting work conditions are further stabilized.

The movement amount and inclination direction of the bottom surface 21 are not particularly restricted. If the bottom surface 21 is inclined with respect to the plane that passes through the center of rotation of the tool body 12, moreover, the angle of the seating surface 5 of the cutting insert 1 is changed corresponding to the change of angle of the bottom surface 21. Specifically, even if the angle of the bottom surface 21 is changed, the same conditions as those for the aforementioned example are set, that is, the same conditions for the rake face 2, cutting edge 4, etc., of the cutting insert 1 that is mounted in the case where the bottom surface 21 is formed along the plane that passes through the center of rotation of the tool body 12.

Although the three cutting inserts 1 have been described in connection with the foregoing example, the number of cutting inserts of the present invention is not limited to three, and some other number may be used. Preferably, in this case, the cutting inserts 1 are arranged symmetrically with respect to an axis.

Further, the radius cutter 10 may be used to machine some material other than metals. The radius cutter may be assembled integrally with cutting edges in place of cutting inserts. The cutting inserts need not always be formed point-symmetrically.

The present invention can be effectively used for metal cutting work such as die cutting.

What is claimed is:

1. A cutting insert for a radius cutter removably mounted on a tool body, the cutting insert for the radius cutter comprising a seating surface, a rake face opposed to the seating surface and configured to be oriented in a direction of rotation of the tool body when mounted on the tool body, and a flank face formed between the seating surface and the rake face, wherein an intersection between the rake face and the flank face includes a cutting edge portion composed of a circular-arc cutting edge in the form of a substantially quarter circular arc, located on the outer periphery of the distal end of the tool body, and an outer cutting edge continuous with one end of the circular-arc cutting edge and extending substantially parallel to an axis of the tool body, and a portion recessed a predetermined distance inwardly from the cutting edge portion of the rake face projects on the rotation-direction side of the tool body from the cutting edge portion.

2. A cutting insert for a radius cutter according to claim 1, wherein the circular-arc cutting edge is curved convexly in the direction of rotation of the tool body along the circular-arc cutting edge, and the outer cutting edge continuously contracts the circular-arc cutting edge and extends oppositely from the direction of rotation of the tool body from one end in contact with the circular-arc cutting edge toward the other end.

3. A cutting insert for a radius cutter according to claim 2, wherein the rake face is formed so that an angle to the center of rotation of the tool body is gradually reduced with distance from the cutting edge portion.

4. A cutting insert for a radius cutter according to claim 3, wherein a flat surface perpendicular to the direction of rotation of the tool body is provided within a fan-shaped area defined by the circular-arc cutting edge and a straight line extending from the center point of the circular-arc cutting edge to both ends of the circular-arc cutting edge, if the cutting insert is viewed at right angles to the rake face.

5. A indexable-insert a radius cutter configured so that a cutting insert for the radius cutter according to claim 1 is removably mounted on the tool body.

6. A indexable-insert a radius cutter configured so that a cutting insert for the radius cutter according to claim 2 is removably mounted on the tool body.

7. A indexable-insert a radius cutter configured so that a cutting insert for the radius cutter according to claim 3 is removably mounted on the tool body.

8. A indexable-insert a radius cutter configured so that a cutting insert for the radius cutter according to claim 4 is removably mounted on the tool body.

* * * * *

UNITED STATES PATENT AND TRADEMARK OFFICE
CERTIFICATE OF CORRECTION

PATENT NO. : 7,815,402 B2
APPLICATION NO. : 12/583098
DATED : October 19, 2010
INVENTOR(S) : Satoru Yoshida et al.

Page 1 of 1

It is certified that error appears in the above-identified patent and that said Letters Patent is hereby corrected as shown below:

On the title page, item [73], under "Assignee", "Tunalogy Corporation, Kanagawa (JP); OSG Corporation, Aichi (JP)" should read -- Tungaloy Corporation, Kanagawa (JP); OSG Corporation, Aichi (JP) --

Signed and Sealed this
Fifth Day of June, 2012

David J. Kappos
*Director of the United States Patent and Trademark Office*